US012101388B2

(12) United States Patent
Tegel (10) Patent No.: US 12,101,388 B2
(45) Date of Patent: Sep. 24, 2024

(54) UNIVERSAL BINARY SPECIFICATION MODEL (71) Applicant: William Tegel, Chicago, IL (US)

(72) Inventor: William Tegel, Chicago, IL (US)

( * ) Notice: Subject to any disclaimer, the term of this patent is extended or adjusted under 35 U.S.C. 154(b) by 0 days.

(21) Appl. No.: 18/046,500

(22) Filed: Oct. 13, 2022

(65) Prior Publication Data
US 2024/0129382 A1 Apr. 18, 2024

(51) Int. Cl.
H04L 29/06 (2006.01)
H04L 69/00 (2022.01)
H04L 69/06 (2022.01)

(52) U.S. Cl.
CPC ............. *H04L 69/03* (2013.01); *H04L 69/06* (2013.01)

(58) Field of Classification Search
CPC ............................... H04L 69/03; H04L 69/06
USPC .......................................... 709/220–225, 246
See application file for complete search history.

(56) References Cited

U.S. PATENT DOCUMENTS

| 5,920,711 | A | 7/1999 | Seawright et al. |
| 7,191,433 | B2 | 3/2007 | Narad et al. |
| 7,266,131 | B2 | 9/2007 | Mitchell |
| 7,401,326 | B1 | 7/2008 | Durham et al. |
| 7,590,644 | B2 | 9/2009 | Matsakis et al. |
| 7,634,763 | B2 | 12/2009 | Wain et al. |
| 8,321,465 | B2 | 11/2012 | Farber et al. |
| 8,543,488 | B2 | 9/2013 | Vinokour et al. |
| 9,361,582 | B2 | 6/2016 | Proctor et al. |
| 9,819,719 | B2 | 11/2017 | Hasson et al. |
| 10,218,598 | B2 | 2/2019 | Bermudez et al. |
| 10,778,811 | B2 * | 9/2020 | Lee .......................... H04L 69/18 |
| 2005/0165848 | A1 * | 7/2005 | Kusama .................. G06F 16/51 707/E17.031 |

(Continued)

FOREIGN PATENT DOCUMENTS

| CN | 105337968 | * | 2/2016 |
| CN | 105337968 A | * | 2/2016 |
| EP | 3198799 B1 | | 4/2019 |

OTHER PUBLICATIONS

Elshakankiry Ali et al: "Context 1-30 Sensitive and Secure Parser Generation for Deep Packet Inspection of Binary Protocols", 2017 15th Annual Conference on Privacy, Security and Trust (PST), IEEE, Aug. 28, 2017 (Aug. 28, 2017), pp. 77-7709, XP033411032, DOI: 10.1109/PST.2017.00019 [retrieved on Sep. 28, 2018].

(Continued)

*Primary Examiner* — Younes Naji
(74) *Attorney, Agent, or Firm* — Renner, Otto, Boisselle & Sklar, LLP (57) ABSTRACT A method for creating a normalized binary specification model may include receiving one or more existing binary information documents describing at least one of a binary communication protocol, a binary data storage format, or a binary data processing architecture; discerning relevant binary information items from within the one or more corresponding binary information documents; converting the relevant binary information items into normalized binary components; generating identifiers and assigning a respective identifier to each of the normalized binary components to produce identified normalized binary components; and creating a respective ordered list for each of the normalized binary components.

29 Claims, 4 Drawing Sheets (56) References Cited

U.S. PATENT DOCUMENTS

| | | | |
|---|---|---|---|
| 2010/0088685 A1 | 4/2010 | Ahmed et al. | |
| 2011/0030028 A1* | 2/2011 | Menten | H04L 63/0263 726/1 |
| 2012/0330877 A1* | 12/2012 | Proctor | G06N 5/025 706/47 |
| 2013/0325534 A1* | 12/2013 | Fukui | G06Q 10/0631 705/7.12 |
| 2021/0168224 A1* | 6/2021 | Nalliannan | H04L 69/06 |

OTHER PUBLICATIONS

Lamping Anthony Pet Al; "Enhancing SkyVision: Integrating UAS Flight Information with ATC Data", A 2021 International Conference on Unmanned Aircraft Systems (ICUAS), IEEE, Jun. 15, 2021 (Jun. 15, 2021), pp. 1595-1604, XP033942563, DOI: 10.1109/ICUAS51884.2021.9476708, [retrieved on Jul. 6, 2021].

Dean Thomas et al: "A Survey of Binary Protocol Parsers", SSRN Electronic Journal, Oct. 3, 2022, (Oct. 3, 2022), pp. 1-18, XP093102865, DOI: 10.2139/ssrn.4246617, Retrieved from the Internet: URL: https://papers.ssrn.com/sol3/papers.cfm?abstract_id=4246617. [retrieved on Nov. 17, 2023].

* cited by examiner

UNIVERSAL BINARY SPECIFICATION MODEL

BACKGROUND

There are three main types of binary information: binary communication protocols, binary data storage formats, and binary data processing architectures.

Communication protocols may be used to define and describe how to establish efficient communication between two or more computing devices, such as a computer or smartphone. For example, communication protocols may establish a set of rules that determines how data is transmitted between different devices over a network. Exemplary communication protocols include binary protocols and text-based protocols where binary protocols are typically intended to be primarily machine readable and text-based protocols are typically intended to be human readable. As transmission speed and interpretation of binary communication protocols tends to be faster compared to text-based protocols, binary protocols may be used for applications requiring fast processing and efficient data transmission. When developing binary protocols, binary data may take on various forms, such as records or messages which convey information or perform operations.

Binary descriptions are documents created to describe various aspects of a binary protocol. Examples of binary communication protocols having corresponding binary descriptions include TotalView-ITCH, promulgated by Nasdaq for financial market data dissemination and iLink3 Order Entry SBE, promulgated by CME Group for electronic trading order entry.

Data storage or file formats may be used to define and describe how to encode information for storage on a computing device. A file format is a standard way that information is encoded for storage in a computer file. It specifies how bits are used to encode information in a digital storage medium. For example, a file format may encode images in a binary format or text in a stream of characters. Some file formats are designed for very particular types of data: PCAP (Packet Capture) files, for example, store data recorded by network traffic capture interfaces. Some file formats, such as XML and the source code of computer software are text files with defined syntaxes that allow them to be used for specific purposes. Some data is stored in databases, such as an RDBMS (Relational Database Management System) like SQL with underlying storage files organized and formatted for efficient retrieval. Binary data storage and file formats may be more compact, efficient and machine readable. Binary file formats often have published documentation describing the encoding method. However, not all binary file formats have freely available descriptions, partly because some developers view their documentation as trade secrets, and partly because a formal description was never created. If a description of a binary file format does not exist or is incomplete, another developer looking to utilize that kind of file may reverse engineer the file or files to complete the full specification.

Binary data processing architectures use digital logic to interpret and execute programming instructions and perform arithmetic operations. For example, a microprocessor is a digital electric circuit that accepts binary data as input, processes it according to instructions stored in its memory and provides results in binary form. Additionally, digital logic in field programmable gate arrays could accelerate network packet processing, or application specific integrated circuits could be designed to run a high efficiency video codec. Vector processors work in parallel to accelerate calculations on large blocks of information. Binary data processing architectures may use Hardware Description Languages (HDL) such as Verilog to define and describe how computing devices process information. An HDL is a specialized computer language used to describe the structure and behavior of electronic circuits, and most commonly, digital logic circuits. HDL enables a precise, formal description of an electronic circuit that allows for the automated analysis and simulation of the electronic circuit. HDL looks much like a programming language such as C; it is a textual description consisting of expressions, statements and control structures. HDL digital logic descriptions are an integral part of electronic design automation systems, especially for complex circuits, such as application-specific integrated circuits, microprocessors, and programmable logic devices.

Source code may be generated based on the information provided in the documentation used to implement and/or describe binary communication protocols, binary data storage formats, and binary data processing architectures.

However, there are some drawbacks associated with generating source code based on binary information such as binary communication protocols, binary data storage formats, and binary data processing architectures. For example, the binary descriptions that describe communication protocols tend to be imperfect. That is, binary descriptions typically contain highly technical and complex information, have incorrect information, and/or are missing information. As generating source code based on the binary descriptions typically requires some development to be performed manually, making the source code generation process a tedious, laborious, and error-prone process.

Further, binary communication protocols (and, therefore, the corresponding binary descriptions) may be updated or replaced requiring additional source code to be generated. Many applications use multiple binary protocols associated with different transfer layers (e.g., layers of the Open Systems Interconnection model) requiring a relatively large amount of source code to be manually written in each applicable source code programming language.

Prior art binary communication protocol modeling techniques attempting to address the above drawbacks have proven ineffective, inefficient, and/or unsatisfactory. For example, prior art binary communication protocol modeling techniques are language-dependent, platform-dependent, use declarative languages to manually describe binary data structures (e.g., users are required to manually describe binary data structures in a custom programming language before being compiled into custom source code), are non-extensible, and/or require manual translation of binary descriptions into user-defined protocols stored in a protocol database.

Although the present disclosure discloses the invention primarily in the context of binary communication protocols, the invention is similarly applicable to other binary information such as binary data storage formats and binary data processing architectures, which have similar drawbacks.

SUMMARY

A universal binary specification model and a method for creating a universal binary specification model of the present disclosure improve on prior art binary information models in various significant ways. For example, the universal binary specification models of the present disclosure may universally represent one or more binary communication protocols, binary data storage formats, or binary data processing architectures including those from one or more different sources, with normalized binary components. Accordingly, the normalized binary components corresponding to the one or more different types of binary information may be composed to form the universal binary specification model.

Additionally, the universal binary specification model of the present disclosure may be modified quickly and efficiently by manipulating one or more elementary components associated with the universal binary specification model. For example, elementary components may be removed, replaced, and/or modified in any suitable manner.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The techniques of the present disclosure overcome the limitations of the prior art by using flexible, highly composable, platform-independent, language-independent, and extensible universal binary specification models to represent different binary information as normalized binary components. The present disclosure discloses the invention in the context of the binary information in descriptions of binary communication protocols. However, the principles described herein are fully applicable to all types of binary information including, not only binary communication protocols, but also binary data storage formats and binary data processing architectures. Thus, although the present disclosure uses as examples mainly binary communication protocols such as iLink3 SBE and TotalView-ITCH and their corresponding binary descriptions in XML and PDF, the principles disclosed herein are applicable to other binary information sources such as Asn.1, C++ code, Verilog, SQL, etc.

Creating a normalized binary specification model may include receiving one or more existing documents containing binary information including at least one of a binary communication protocol, a binary data storage format, or a binary data processing architecture, discerning relevant binary information items from within the one or more existing binary information documents, converting the relevant binary information items into normalized binary components including one or more types, groups, rules, values, or actions, generating identifiers and assigning a respective identifier to each of the normalized binary components to produce identified normalized binary components, and creating a respective ordered list for each of the normalized binary components. As the normalized binary components may be classified as components of the universal binary specification model, the universal binary specification model may represent the binary information as lists of normalized binary components of the universal binary specification model.

Some exemplary benefits of the techniques of the present disclosure as compared to the prior art include reducing the use of declarative languages to predefine binary data structures, eliminating custom translations of binary communication protocols into language-specific protocol models stored in a database, more efficient binary communication protocol processing (e.g., faster and more accurate processing), and more efficient and more flexible manipulation of data contained in the universal binary specification models (e.g., the elementary components may be classified into one or more of the normalized components allowing fast access via the identifiers and, since the elementary components are composable and extensible, the data contained in the universal binary specification models may be highly customizable). As such, the techniques of the present disclosure provide an improvement in the functioning of the computer itself (e.g., using less memory, more efficient processing, faster data manipulation, etc.) and an improvement in the technological field of binary communication protocol modeling.

Generally, for example, if a binary communication protocol from one binary communication protocol description includes components documented in Extensible Markup Language (XML) (e.g., original components described in XML) and another binary protocol documented in Portable Document Format (PDF) the techniques of the present disclosure may process the binary communication protocols to create a universal binary specification model that may represent at least a portion of one or more of the original components described in XML and/or at least a portion of one or more of the original components described in PDF format as normalized binary components of the universal binary specification model.

If the binary communication protocol described in XML and/or the binary communication protocol described in PDF format are updated, has incorrect information, and/or are missing information, the normalized binary components may be quickly and efficiently accessed based, at least in part, on identifiers to make any desired changes to the universal binary specification model. Similarly, if the binary communication protocol described in XML and/or the binary communication protocol described in PDF format are replaced, the normalized binary components may be quickly and efficiently removed and/or replaced based, at least in part, on the identifiers. Similarly, if an additional binary communication protocol including components described in Abstract Syntax Notation One (ASN.1) (e.g., original components described in ASN.1) or existing C++ source code, the techniques of the present disclosure may be used to add one or more of the normalized binary components representing at least a portion of one or more of the original components described in ASN.1 or C++ source code to the universal binary specification model.

Figure 1:
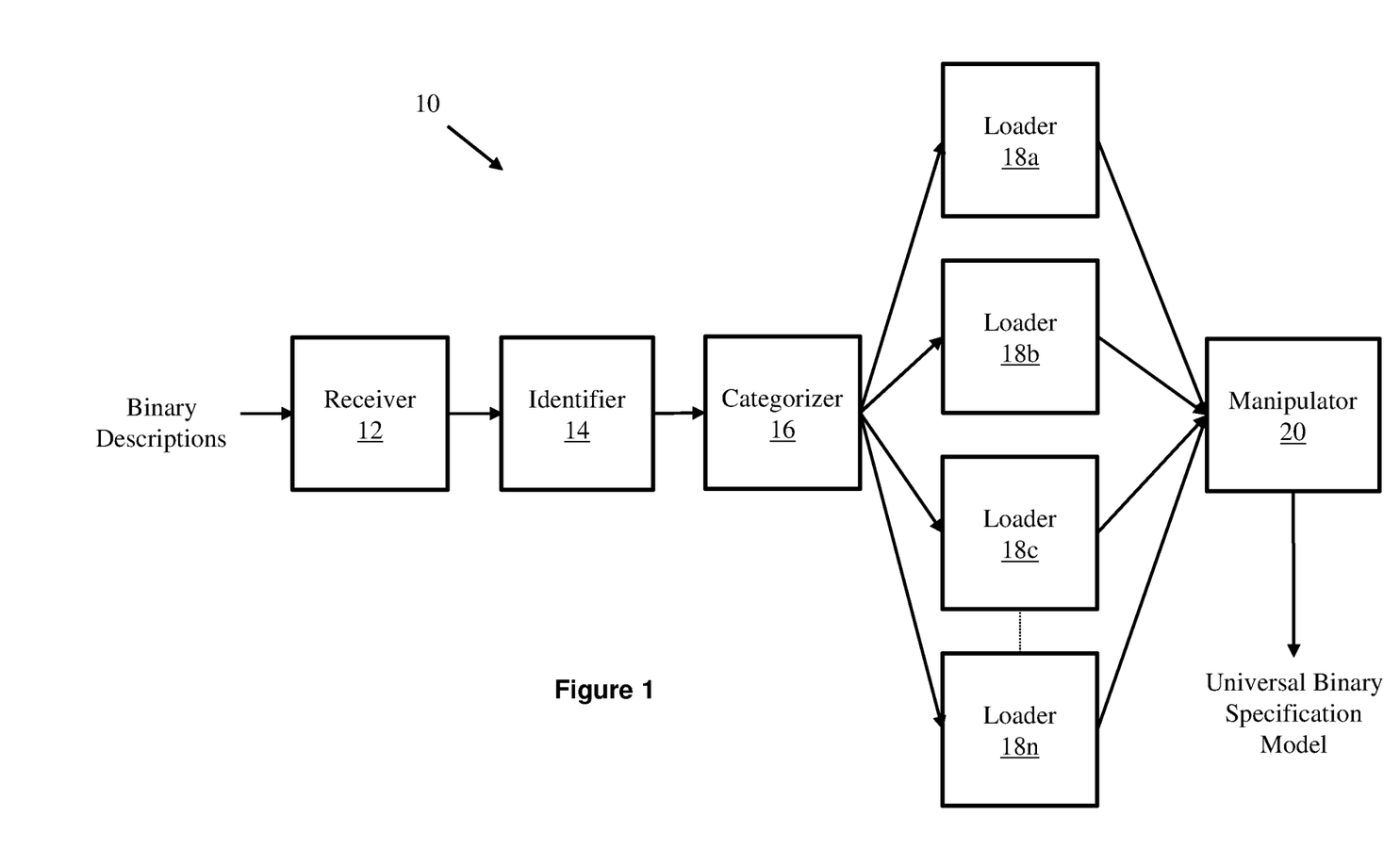
FIG. 1 illustrates a block diagram of an exemplary embodiment of a universal binary specification model generator for creating a universal binary specification model.

Looking to an exemplary implementation of the techniques of the present disclosure, an exemplary universal binary specification model generator 10 is shown in FIG. 1. The universal binary specification model generator 10 may include a receiver 12, an identifier 14, a categorizer 16, loaders 18, and a manipulator 20.

The receiver 12 may receive one or more existing binary descriptions such as, for example, binary communication protocol documents corresponding to one or more binary communication protocols. As the universal binary specification model generator 10 is platform-independent and language-independent, the receiver 12 may receive any well-formed binary description regardless of the language used to write, or the platform associated with, the binary description and regardless of the corresponding binary communication protocol.

The receiver 12 may provide the binary descriptions to the identifier 14. The identifier 14 may identify a data layout, such as a metalanguage (e.g., XML), a standard format (e.g., Portable Document Format (PDF), etc.), and/or any other suitable data layout (e.g., declarative language text files), or existing source code (e.g., C++ structs, etc.) of the one or more binary descriptions and assign a description type. Based on the description type, the categorizer 16 may assign each of the one more binary descriptions to a respective loader 18.

Each of the loaders 18 is designed to handle a specific type of binary description. For example, loader 18a may be designed to handle ITCH PDF while loader 18b may be designed to handle SBE XML (Simple Binary Encoding), etc. Each of the loaders 18 may ingest its respective type of binary description and discern relevant binary information items from within the one or more descriptions. From that information, each of the loaders 18 may convert the relevant binary information items into normalized binary components including types, groups, rules, values, and actions.

Figure 2:
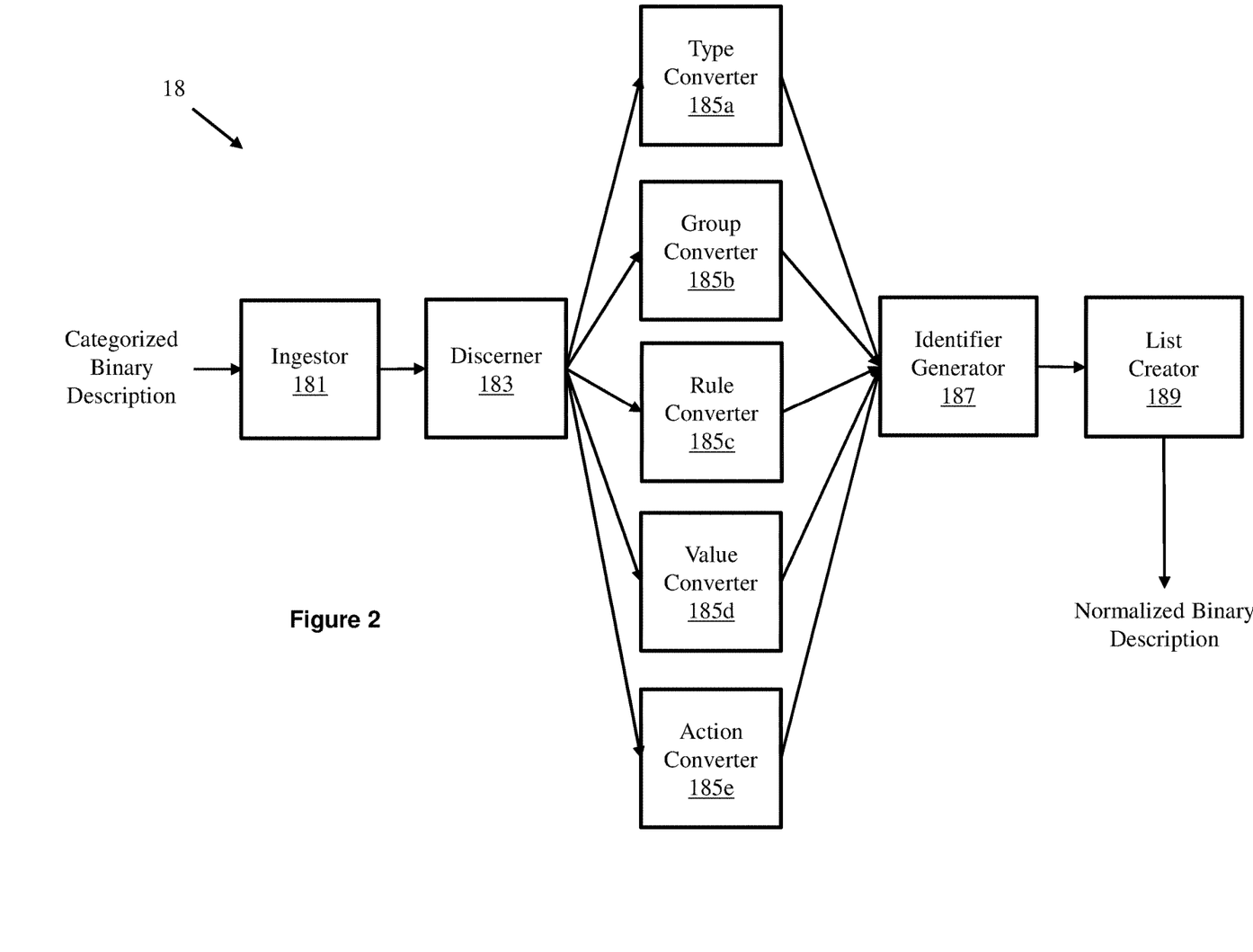
FIG. 2 illustrates a block diagram of an exemplary loader.

FIG. 2 illustrates a block diagram of an exemplary loader 18. The loader 18 includes an ingestor 181 that ingests its respective type of binary description as categorized by the categorizer 16. The loader 18 further includes a discerner 183 that discerns relevant binary information items from within the binary description ingested and passes those items to corresponding converters 185. The loader 18 may include one converter 185 for each of the normalized binary components (i.e., types, groups, rules, values, and actions). Thus, in the illustrated embodiment, the loader 18 includes a type converter 185a, a group converter 185b, a rule converter 185c, a value converter 185d, and an action converter 185e. In one embodiment, the loader 18 may also include a details converter. Each of the converters 185 converts the relevant binary information items into their respective normalized binary components: types, groups, rules, values, actions, and details.

Normalized binary types may be defined as discrete and uniquely specified field types (e.g., a quantity or price field). Each normalized binary type may include a name property, an identifier, an extensible list of elementary traits (e.g., size, a translation format (e.g., integer, ASCII, Floating Point, etc.), an underlying memory type, signedness, endianness, etc.), and an extensible list of characteristics that may provide information related to various aspects of the binary type. For example, a binary description may include information related to a binary data type such as an alphanumeric symbol field or a C++ std::uint32_t timestamp.

Normalized binary groups may be defined as specified ordered groups of fields (e.g., packet header, time message, etc.) Each normalized binary group may include a name property, an identifier, an ordered extensible list of fields, and extensible characteristics list that may provide information related to various aspects of the binary groups. Exemplary characteristics may relate to, for example, how the binary groups are processed, whether the normalized binary groups may be messages, headers, composites (e.g., field with multiple sub-types), or subgroups, and instructions for composite types, data layouts, and/or data rules, etc. For example, a PDF binary description may contain tables of binary messages or C source code may declare a packed struct defining header fields.

Normalized binary rules may be defined as runtime parsing rules for fields (e.g., branches, counts, sizes, formatting, reassemble, etc.). Each normalized binary rule may have a type (e.g., count, size, branch, etc.), an identifier, and may have an ordered extensible parameter list, such as, for example, runtime field dependencies (identifiers to fields that contain required dependent runtime data), operators (equals, minus, etc.), runtime branch locations, or static data, etc. For example, a binary rule may be used to describe a runtime length of a variable length field. In another example, if a group is repeated a variable number of times, a binary rule may describe the number of runtime repetitions of that group.

Normalized binary values may be defined as specific values corresponding to fields or groups. Each normalized binary value may have a type (e.g., static, min, max, no value, enum etc.), an identifier, data properties, and an extensible list of elementary traits (e.g., size, a translation format, endianness, etc.). Exemplary values may be an enumerated value (which represents a predefined value), no value (which represents a sentinel value that signifies the field is not used in the current instance), or static (which represents fixed data or data that changes infrequently), etc. For example, in a type with enumerated values buy=1, sell=2, no other values are valid. In the case of a static value, a binary type containing the version might be 7 and always 7.

Normalized binary actions may be defined as high level operations or behaviors. Exemplary actions include how to process heartbeats (a periodic signal generated to indicate normal operation or to synchronize other parts of a computer system), how message sequence numbers are handled (for gap detection), or when to apply updates using the binary information contained in a packet (e.g., apply after each message or end of packet), etc.

Normalized binary details may be defined as the distinguishing details of an individual binary communication protocol, binary data storage format, or binary data processing architecture. Details may include the organization and department responsible for designing and maintaining a binary protocol, or common abbreviations for this information. Other details may include version, purpose, and dates, etc. Details are extensible and may include references to the original binary documentations and organizations, etc. For example, iLink3 OrderEntry SBE is owned and maintained by CME Group Inc, which may be abbreviated as CME. iLink3 is used for efficient order entry while SBE signifies Simple Binary Encoding.

The loader 18 may further include an identifier generator 187 that generates an identifier for each of the normalized binary components to produce identified normalized binary components. The generated identifiers are based on attributes of the components such that each of the normalized binary components may be quickly accessed and/or modified using the identifiers.

The loader 18 may also include a list creator 189 that creates a respective ordered list for each of the identified normalized binary components to output the normalized binary description.

For example, if an original component of a binary communication protocol documented in PDF is defined as a field with a name "Example Field" and type as "Integer" and where "Integer" is defined as an unsigned 8-byte integer with a Big-Endian byte order, the loader 18 may discern the field as a binary type, convert the original field to a normalized binary type, and classify the normalized binary type as a component of the universal binary specification model. The type converter 185a of the loader 18 may generate a name, Name=Example Field, and an identifier, Identifier=examplefield, for the normalized binary type. The type converter 185a of the loader 18 may deconstruct elementary traits of: trait[0] Size=8; trait[1] Translation=integer; trait[2] Signedness=Unsigned; trait[3] Memory=Bytes; and trait[4] Endianness=Big for the normalized binary type. The loader 18 may classify the type as a normalized binary type (i.e., the component) of the universal binary specification model and may then create a respective ordered list for each of the normalized binary components.

Returning to FIG. 1, the system 10 may further include the manipulator 20, which receives the normalized binary descriptions from the loaders 18. The manipulator 20 may combine multiple normalized binary descriptions to create the universal binary specification model. In the event changes need to be made to the universal binary specification model based on the binary description (i.e., the binary description document corresponding to the binary communication protocol may change the binary communication protocol, the binary description may contain incorrect information, and/or the binary description may be missing information), the manipulator 20 may perform multiple modification operations on the data contained in the universal binary specification model, such as, for example, renaming normalized components, removing normalized components, replacing normalized components, adding normalized components, overwriting normalized components, and/or any other suitable modification operation. Exemplary modification operations are described below.

For example, if the binary description document corresponding to the binary communication protocol of this example replaces one or more original components of the binary communication protocol with one or more replacement components, the loader 18 may deconstruct the replacement components into normalized binary components. The loader 18 may also generate identifiers for the normalized binary components and classify the normalized binary components into one or more of the normalized components of the universal binary specification model. The manipulator 20 may replace the normalized components corresponding to the original components with the replacement normalized components based, at least in part, on the identifiers of the normalized components corresponding to the original components and the identifiers of the replacement normalized components.

For example, if a replacement component is a replacement field replacing the original field (e.g., the field having the name Example Field), and the replacement field is defined as a type (i.e., a normalized binary type) with a name property of "Replacement Field" and where the replacement type is a signed 4-byte unsigned integer with a Little-Endian byte order, the loader 18 may deconstruct the field into a normalized binary component, generate an identifier for the normalized binary component, and classify the normalized binary component as a component of the universal binary specification model. In this example, the normalized binary component may be Name=Replacement Field, Identifier=replacementfield and elementary traits of: trait[0] Size=4; trait[1] Translation=Integer; trait[2] Signedness=Unsigned; trait[3] Memory=Bytes; and trait[4] Endianness=Little, and the component may be a normalized binary type. The manipulator 20 may replace Example Field with Replacement Field.

In the event that the binary description of this example contains incorrect information (e.g., the field having the name Example Field is defined as a signed integer instead of an unsigned integer), the manipulator 20 may manipulate the elementary component of the universal binary specification model associated with the incorrect information. For example, the manipulator 20 may change trait Signedness=Unsigned to trait Signedness=Signed for the normalized binary type having the name Example Field.

In the event that the binary description of this example is missing information (i.e., the field having the name Example Field is missing an elementary trait, such as Precision=6), the manipulator 20 may add the missing elementary trait to the normalized binary type having the name Example Field (i.e., trait[5] Precision=6) in the universal binary specification model.

If the binary description document corresponding to the binary description of this example updates the binary communication protocol with one or more additional components, the loader 18 may deconstruct the additional components into normalized binary components. The loader 18 may generate identifiers for the normalized binary components and classify the normalized binary components into one or more of the components of the universal binary specification model. The outcome is a series of ordered lists. The loader 18 creates a respective ordered list for each of the normalized binary components. Each list is ordered, meaning the normalized binary components appear sequentially within the list.

For example, if an additional component is an additional field defined as a type (i.e., a binary field type) with a name of "Additional Field" and where the field is described as a 4-byte ASCII (American Standard Code for Information Interchange), the loader 18 may deconstruct the original field into a normalized binary component. The loader 18 may generate an identifier for the normalized binary component and classify the normalized binary normalized binary type of the universal binary specification model. In this example, the normalized binary component may be Name=Additional Field, Identifier=additionalfield and traits of: trait[0] Size=4; trait[1] Translation=ASCII; and trait[3] Memory=Bytes; and the component may be a normalized binary type. The manipulator 20 may append the normalized binary type having the name Additional Field to the ordered list for normalized binary types list of the universal binary specification model.

The identifiers are based on attributes of the components. In a first iteration, the loader 18 obtains some information from the normalized binary components and generates the identifiers from the obtained information. The loader 18 may then verify whether each of the identifiers in the first iteration is unique. If each of the identifiers in the first iteration is unique, continue. If each of the identifiers in the first iteration is not unique, the loader 18 may obtain further information from the normalized binary components and generate a second iteration of identifiers in which the non-unique identifiers from the first iteration are made more complex incorporating more information from the component. Thus, identifiers are unique at least within portions that interact with each other or globally. Identifiers should be as complex as it needed to guarantee uniqueness but, ideally, not more. For example, a first iteration of an identifier may be "examplefield." The loader 18 may then check whether the identifier is unique and, if not, obtain additional information and modify using some of the additional information. A second iteration may be, thus, be "examplefielduint64."

Lists of uniquely identified normalized binary components and the universally extensible features of the elementary components (e.g., the universally extensible traits of normalized binary types and values, universally extensible fields of normalized ordered binary groups, universally extensible parameters of normalized binary rules, and the universally extensible characteristics of normalized binary types and groups, etc) allow the universal binary specification model to universally represent binary communication protocols in a flexible and customizable manner.

In a real example, an original component of CME Group's iLink3 SBE binary communication protocol described in XML format may be defined as a message element having a name attribute of "Sequence506" and id attribute of "506". This message element contains a first inner field element with name attribute of "UUID", an id attribute of "39001", a type attribute of "uInt64", a description attribute of "Matches Establish UUID used to establish the connection", an offset attribute of "0", and a semantic type attribute of "int". The message element contains an additional ordered inner field element with name attribute of "NextSeqNo," an id attribute of "39013", a type attribute of "uInt32", a description attribute of "Next expected message sequence number," an offset attribute of "8", and a semantic type attribute of "int". The message element contains an additional ordered inner field element with name attribute of "FaultToleranceIndicator", an id attribute of "39010", a type attribute of "FTI", a description attribute of "Indicates whether the connection is primary or backup", an offset attribute of "12", and a semantic type attribute of "int". The message element contains a final additional ordered inner field element with name attribute of "KeepAliveIntervalElasped", an id attribute of "39016", a type attribute of "KeepAliveElasped", a description attribute of "Indicates if the sequence message being sent is to warn that one keep alive has elapsed", an offset attribute of "13", and a semantic type attribute of "int". Additionally, another original component of CME Group's iLink3 SBE binary communication protocol described in XML format may be defined as an enum element with name attribute of "FTI" and encoding type attribute of "uInt8NULL." The enum element contains first inner value element with name attribute of "Backup" defined as "0" and second inner value element with name attribute of "Primary" defined as "1".

The receiver 12 may receive a binary description containing the above XML elements and the identifier 14 may identify the format as SBE XML description type. The categorizer 16 may assign the binary description to the SBE XML loader 18b.

The SBE XML loader 18b may discern the message element as a binary group, convert the original message element to a normalized binary group, and classify the normalized binary group as a component of the universal binary specification model. The group converter 185b of the SBE XML loader 18b may generate a name, Name=Sequence Message and an identifier, Identifier=sequencemessage, for the normalized binary group. The group converter 185b of SBE XML loader 18b may deconstruct fields of the ordered field list of: field[1] Identifier=uuid; field[2] Identifier=nextseqno; field[3] Identifier=faulttoleranceindicator; field[4] Identifier=keepaliveintervallapsed and characteristics of: characteristic[1] Category=Message, characteristic[2] Fix=506 for the normalized binary group. The SBE XML loader 18b may generate identifiers for the normalized binary components where the identifiers of the ordered fields of the respective groups may be the same identifiers such that the each of the ordered fields may be located in the respective components lists of the universal binary specification model. The SBE XML loader 18b may classify the group as a normalized binary group and append it to the normalized binary groups list of the normalized binary description.

Additionally, the SBE XML loader 18b may also discern the message element as a runtime binary rule, convert the original message element to a normalized binary rule, and classify the normalized binary rule as a component of the universal binary specification model. The rule converter 185c of the SBE XML loader 18b may generate an identifier, Identifier=payload, and assign a normalized rule type, Type=Branch, for the normalized binary rule. The rule converter 185c of SBE XML loader 18b may deconstruct elementary parameters of the ordered parameter list of: parameter[1] Dependency=templateid; parameter[2] Operator=Equals; parameter[3] Data=506; parameter[4] Branch=sequencemessage for the normalized binary rule. The identifiers related to the rule and parameters of the respective rules may be the same identifiers such that the each of the normalized components may be located in the respective components lists of the universal binary specification model. The SBE XML loader 18b may classify the rule as a normalized binary rule and append it to the normalized binary rules list of the normalized binary description.

The SBE XML loader 18b may also discern the enum element and inner value elements as binary values, convert the original enum and inner value elements to normalized binary values, and classify the normalized binary values as components of the universal binary specification model. The value converter 185d of the SBE XML loader 18b may generate an identifier, Identifier=faulttoleranceindicator, and assign Type=Enum, Name=Backup, and Data=0 properties for the first normalized binary value. The value converter 185d of the SBE XML loader 18b may generate an identifier, Identifier=faulttoleranceindicator, assign Type=Enum, Name=Primary, and Data=1 properties for the second normalized binary value. The value converter 185d of the SBE XML loader 18b may generate an identifier, Identifier=faulttoleranceindicator, assign Type=No Value, Name=No Value, and Data=255 properties for a third normalized binary value. The identifiers related to the normalized binary values may be the same identifiers such that the associated normalized components may be located in the respective components lists of the universal binary specification model. The SBE XML loader 18b may then classify the values and add these normalized binary values to the normalized binary values list of the normalized binary description.

The SBE XML loader 18b may also discern the inner field elements of the message element as binary types, convert the original inner field elements to normalized binary types, and classify the normalized binary types as components of the universal binary specification model. The type converter 185a of the SBE XML loader 18b may generate a name, Name=Uuid, an identifier, Identifier=uuid, and may deconstruct elementary traits of: trait[0] Size=8; trait[1] Translation=integer; trait[2] Signedness=Unsigned; trait[3] Memory=Bytes; and trait[4] Endianness=Liltte for the first normalized binary type. The type converter 185a of the SBE XML loader 18b may generate a name, Name=Next Seq No, an identifier, Identifier=nextseqno, and may deconstruct elementary traits of: trait[0] Size=4; trait[1] Translation=integer; trait[2] Signedness=Unsigned; trait[3] Memory=Bytes; and trait[4] Endianness=Little for the second normalized binary type. The type converter 185*a* of the SBE XML loader 18*b* may generate a name, Name=Fault Tolerance Indicator, an identifier, Identifier=faulttoleranceindicator, and may deconstruct elementary traits of: trait[0] Size=1; trait[1] Translation=integer; trait[2] Signedness=Unsigned; trait[3] Memory=Bytes; for the third normalized binary type. The type converter 185*a* of the SBE XML loader 18*b* may generate a name, Name=Keep Alive Interval Elasped, an identifier, Identifier=keepaliveintervalelasped, and may deconstruct elementary traits of: trait[0] Size=1; trait[1] Translation=integer; trait[2] Signedness=Unsigned; trait[3] Memory=Bytes; for the forth normalized binary type. The identifiers related to the normalized binary types may be the same identifiers such that the associated normalized components may be located in the respective components lists of the universal binary specification model. The SBE XML loader 18*b* may then classify the normalized binary types and add these normalized binary values to the normalized binary types list of the normalized binary description.

The manipulator 20 may insert characteristic[3] Class=Admin into the characteristic list of normalized binary component with Name=Sequence Message and the Identifier=sequencemessage. The manipulator 20 may add a normalized binary action signifying sequence number update to the normalized binary actions list of the normalized binary description.

If a normalized binary description for CME Group's Simple Open Frame Header (the higher transport protocol layer) has been created by a loader 18*c*, the manipulator 20 may then combine these normalized binary descriptions (e.g. Simple Open Frame Header and iLink3 SBE Order Entry) to create the universal binary specification model for iLink3 SBE Order Entry.

Figure 3:
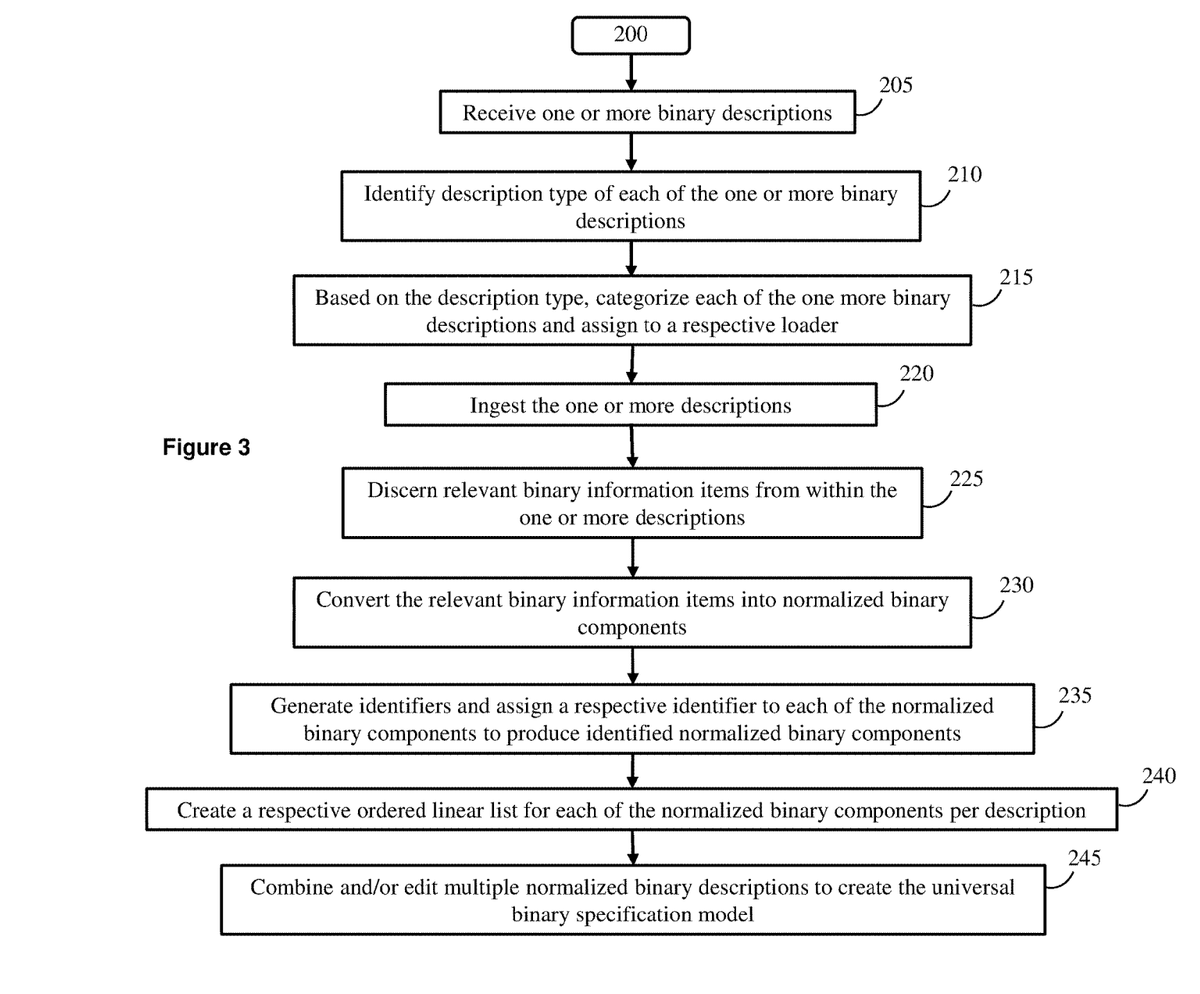
FIG. 3 illustrates a flow diagram of an exemplary method for creating a universal binary specification model.

Exemplary methods may be better appreciated with reference to the flow diagram of FIG. 3. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 3 illustrates a flow diagram of an exemplary method 200 for creating a universal binary specification model. At 205, the method 200 may include receiving binary information in the form of one or more binary descriptions (e.g., protocol and data specification). At 210, the method 200 may identify the description type of each of the one or more existing binary descriptions. At 215, the method 200 may, based on the description type, categorize each of the one more binary descriptions and assign them to a respective loader from a plurality of loaders. At 220, each loader may then ingest the one or more descriptions, at 225, discern relevant binary information items from within the one or more descriptions, and at 230, convert the relevant binary information items into normalized binary components. The normalized binary components include types, groups, rules, values, and actions. At 235, the method 200 further includes generating identifiers and assigning a respective identifier to each of the normalized binary components to produce identified normalized binary components. At 240, the method 200 may include creating a respective ordered list for each of the normalized binary components per description. At 245, the method 200 combines and/or edits multiple normalized binary descriptions to create the universal binary specification model.

In one embodiment, identifying the description type includes identifying the relevant binary information items within each of the one or more existing binary descriptions and comparing the relevant binary information items within the one or more existing binary descriptions to known description formats, and based on the comparison, assign a description type to each of the one or more existing binary descriptions.

In one embodiment, converting the relevant binary information items into normalized binary components may include normalizing semantics of names in the relevant binary information into names of normalized binary components.

In one embodiment, converting the relevant binary information items into normalized binary components may include deconstructing binary types of the existing elementary binary components into lists of elementary type traits.

In one embodiment, converting the relevant binary information items into normalized binary components may include deconstructing binary rules of the existing elementary binary components into ordered lists of elementary runtime rule parameters.

In one embodiment, the normalized binary components include details including organization, version, date, and active/inactive status, etc.

In one embodiment, generating identifiers includes obtaining information from the normalized binary components and generating the identifiers from the obtained information. In one embodiment, generating identifiers includes obtaining information from the normalized binary components, generating a first iteration of identifiers from the obtained information, checking whether each of the identifiers in the first iteration is unique and, if not, generating a second iteration of identifiers in which the non-unique identifiers from the first iteration are made more complex.

In one embodiment, the method 200 includes providing a normalized binary specification editing domain specific language for a user to edit the content of the identified normalized binary components. The domain specific normalized binary specification editing language searches for the identifiers and changes normalized binary component information based on the identifiers.

The description type of each of the one or more existing binary descriptions include at least one of binary communication protocols, binary data storage formats, or binary data processing architectures.

While FIG. 3 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 4:
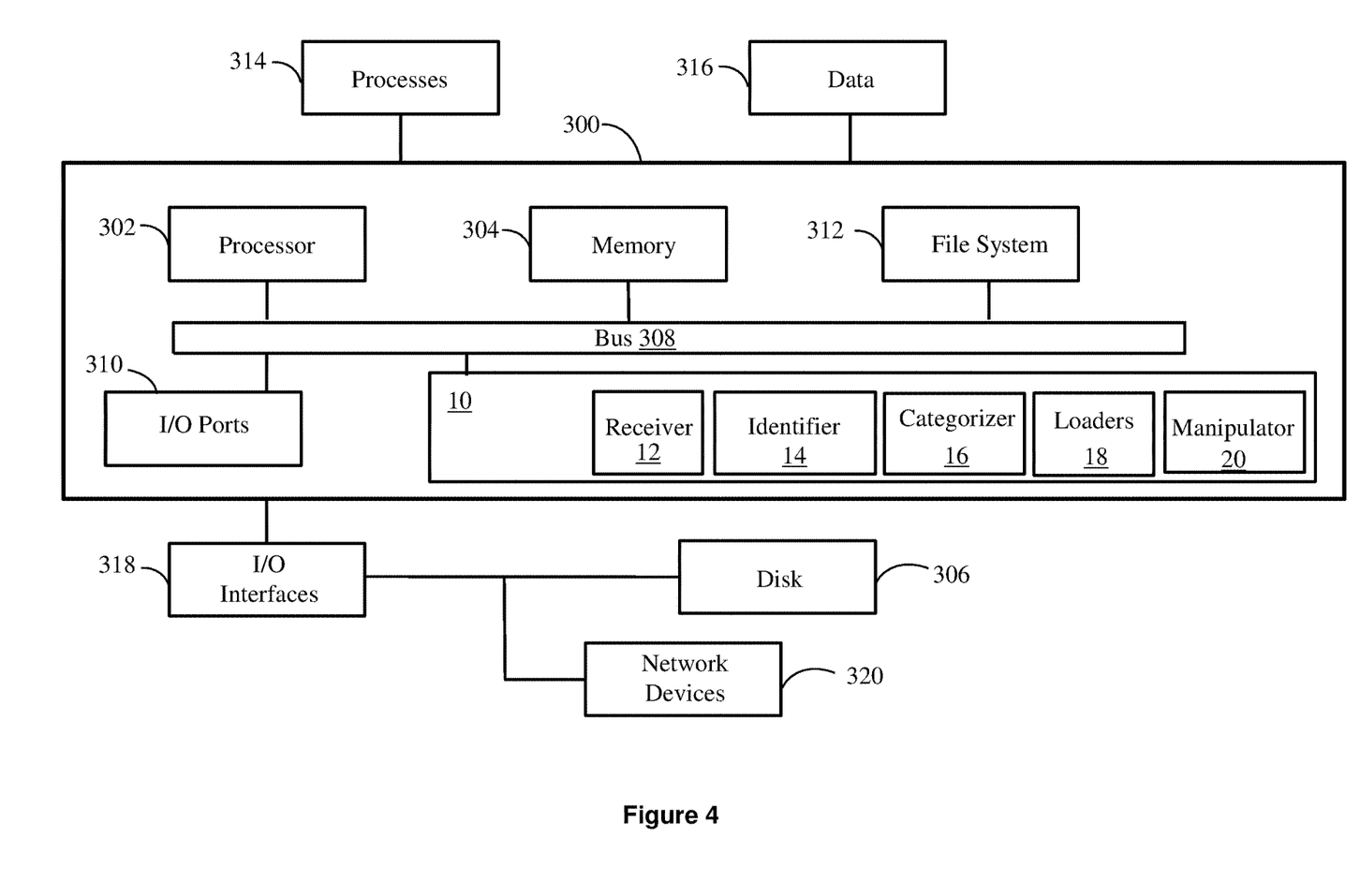
FIG. 4 illustrates a block diagram of an exemplary machine for creating a universal binary specification model.

FIG. 4 illustrates a block diagram of an exemplary machine 300 for creating a universal binary specification model. The machine 300 may include a processor 302, a memory 304, I/O Ports 310, and a file system 312 operably connected by a bus 308.

In one example, the machine 300 may transmit input and output signals via, for example, I/O Ports 310 or I/O Interfaces 318. The machine 300 may also include the universal binary specification model generator 10 and its associated components (e.g., the receiver 12, the loader 18, the identifier 14, the categorizer 16, and the manipulator 20). Thus, the universal binary specification model generator 10, and its associated components, may be implemented in the machine 300 as hardware, firmware, software, or combinations thereof and, thus, the machine 300 and its components may provide means for performing functions described herein as performed by the universal binary specification model generator 10 and its associated components.

The processor 302 can be a variety of various processors including dual microprocessor and other multi-processor architectures. The memory 304 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 306 may be operably connected to the machine 300 via, for example, an 1/O Interfaces (e.g., card, device) 318 and an I/O Ports 310. The disk 306 can include, but is not limited to, devices like a magnetic disk drive, a solid state disk drive, a floppy disk drive, a tape drive, a Zip drive, a flash memory card, or a memory stick. Furthermore, the disk 306 can include optical drives like a CD-ROM, a CD recordable drive (CD-R drive), a CD rewriteable drive (CD-RW drive), or a digital video ROM drive (DVD ROM). The memory 304 can store processes 314 or data 316, for example. The disk 306 or memory 304 can store an operating system that controls and allocates resources of the machine 300.

The bus 308 can be a single internal bus interconnect architecture or other bus or mesh architectures. While a single bus is illustrated, it is to be appreciated that machine 300 may communicate with various devices, logics, and peripherals using other busses that are not illustrated (e.g., PCIE, SATA, Infiniband, 1394, USB, Ethernet). The bus 308 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 300 may interact with input/output devices via 1/O Interfaces 318 and I/O Ports 310. Input/output devices can include, but are not limited to, a keyboard, a microphone, a pointing and selection device, cameras, video cards, displays, disk 306, network devices 320, and the like. The I/O Ports 310 can include but are not limited to, serial ports, parallel ports, and USB ports.

The machine 300 can operate in a network environment and thus may be connected to network devices 320 via the 1/O Interfaces 318, or the I/O Ports 310. Through the network devices 320, the machine 300 may interact with a network. Through the network, the machine 300 may be logically connected to remote devices. The networks with which the machine 300 may interact include, but are not limited to, a local area network (LAN), a wide area network (WAN), and other networks. The network devices 320 can connect to LAN technologies including, but not limited to, fiber distributed data interface (FDDI), copper distributed data interface (CDDI), Ethernet (IEEE 302.3), token ring (IEEE 302.5), wireless computer communication (IEEE 302.11), Bluetooth (IEEE 302.15.1), Zigbee (IEEE 302.15.4) and the like. Similarly, the network devices 320 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method comprising:
   creating a normalized binary specification model, including:
      receiving existing binary descriptions corresponding to documents that describe aspects of respective binary communication protocols, binary data storage formats, or binary data processing architectures;
      identifying description type of each of the existing binary descriptions;
      based on the description type, assign each of the existing binary descriptions to a respective loader from a plurality of loaders;
      wherein each loader from the plurality of loaders performs the following steps:
         ingesting corresponding one or more descriptions from the existing binary descriptions;
         discerning relevant binary information items from within the corresponding one or more descriptions;
         converting the relevant binary information items into normalized binary specification components, wherein the normalized binary specification components include:
            (a) normalized binary specification types,
            (b) normalized binary specification groups,
            (c) normalized binary specification rules,
            (d) normalized binary specification values, and
            (e) normalized binary specification actions;
         generating identifiers and assigning a respective identifier to each of the normalized binary specification components to produce identified normalized binary specification components; and
         creating a respective ordered list for each of the normalized binary specification components.

2. The method of claim 1, wherein the identifying the description type includes:
   identifying the relevant binary information items within each of the existing binary descriptions and comparing the relevant binary information items within the existing binary descriptions to known description formats;
   based on the comparison, assign a description type to each of the existing binary descriptions.

3. The method of claim 1, wherein the converting includes:
   normalizing semantics of names in the relevant binary information items into names of the normalized binary specification components.

4. The method of claim 1, wherein the converting includes: deconstructing binary types of existing elementary binary components into lists of elementary type traits.

5. The method of claim 1, wherein the converting includes: deconstructing binary rules of existing elementary binary components into lists of ordered extensible parameters.

6. The method of claim 1, wherein the normalized binary specification components include:
   (f) details including organization, version, date, and active/inactive status.

7. The method of claim 1, wherein the generating identifiers includes:
   obtaining information from the normalized binary specification components; and
   generating the identifiers from the obtained information.

8. The method of claim 1, wherein the generating identifiers includes:
   obtaining information from the normalized binary specification components;
   generating a first iteration of identifiers from the obtained information;
   checking whether each of the identifiers in the first iteration is unique and, if not, generating a second iteration of identifiers in which the non-unique identifiers from the first iteration are made more complex.

9. The method of claim 1, comprising:
   providing a domain specific normalized binary specification editing language for a user to edit content of the identified normalized binary specification components.

10. The method of claim 1, comprising:
    providing a domain specific normalized binary specification editing language for a user to edit content of the identified normalized binary specification components, wherein the domain specific normalized binary specification editing language searches for the identifiers and changes component information.

11. A system comprising:
    a machine or group of machines, each including respective one or more processors, for creating a normalized binary specification model, including:
       a receiver configured to receive existing binary descriptions, wherein each binary description is a document that describes aspects of a respective binary communication protocol, binary data storage format, or binary data processing architecture;
       an identifier configured to identify description type of each of the existing binary descriptions;
       a categorizer configured to, based on the description type, assign each of the existing binary descriptions to a respective loader from a plurality of loaders;
       each loader from the plurality of loaders configured to:
          ingest corresponding one or more descriptions from the existing binary descriptions;

discern relevant binary information items from within the corresponding one or more descriptions;

convert the relevant binary information items into normalized binary specification components, wherein the normalized binary specification components include:
(a) normalized binary specification types,
(b) normalized binary specification groups,
(c) normalized binary specification rules,
(d) normalized binary specification values, and
(e) normalized binary specification actions;

generate identifiers and assigning a respective identifier to each of the normalized binary specification components to produce identified normalized binary specification components; and create a respective ordered list for each of the normalized binary specification components.

12. The system of claim 11, wherein the identifier is configured to:
identify the relevant binary information items within each of the existing binary descriptions and compare the relevant binary information items within existing binary descriptions to known description formats;
based on the comparison, assign a description type to each of the existing binary descriptions.

13. The system of claim 11, each loader from the plurality of loaders configured to:
normalize semantics of names in the relevant binary information items into names of the normalized binary specification components.

14. The system of claim 11, each loader from the plurality of loaders configured to:
deconstruct binary types of existing elementary binary components into lists of elementary type traits.

15. The system of claim 11, each loader from the plurality of loaders configured to:
deconstruct binary rules of the existing elementary binary components into lists of ordered extensible parameters.

16. The system of claim 11, wherein the normalized binary specification components include:
(f) details including organization, version, date, and active/inactive status.

17. The system of claim 11, each loader from the plurality of loaders configured to:
obtain information from the normalized binary specification components; and
generate the identifiers from the obtained information.

18. The system of claim 11, each loader from the plurality of loaders configured to:
obtain information from the normalized binary specification components;
generate a first iteration of identifiers from the obtained information;
check whether each of the identifiers in the first iteration is unique and, if not, generate a second iteration of identifiers in which the non-unique identifiers from the first iteration are made more complex.

19. The system of claim 11, comprising:
a manipulator including a domain specific normalized binary specification editing language for a user to edit content of the identified normalized binary specification components.

20. The system of claim 11, comprising:
a manipulator including a domain specific normalized binary specification editing language for a user to edit content of the identified normalized binary specification components, wherein the domain specific normalized binary specification editing language searches for the identifiers and changes component information.

21. A method comprising:
creating a normalized binary specification model, including:
receiving existing binary descriptions, each of the existing binary descriptions describing at least one of a binary communication protocol, a binary data storage format, or a binary data processing architecture,
identifying a respective type of binary information described in each of the existing binary descriptions;
based on the respective type, assign each of the existing binary descriptions to a respective loader from a plurality of loaders;
wherein each loader from the plurality performs the following steps:
ingesting one or more corresponding binary descriptions from the
existing binary descriptions;
discerning relevant binary information items from within the one or more corresponding binary descriptions;
converting the relevant binary information items into normalized binary specification components, wherein the normalized binary specification components include:
(a) normalized binary specification types,
(b) normalized binary specification groups,
(c) normalized binary specification rules,
(d) normalized binary specification values, and
(e) normalized binary specification actions;
generating identifiers and assigning a respective identifier to each of the normalized binary specification components to produce identified normalized binary specification components; and
creating a respective ordered list for each of the normalized binary specification components.

22. The method of claim 21, wherein identifying the respective type includes:
identifying the relevant binary information items within each of the existing binary descriptions and comparing the relevant binary information items within the existing binary descriptions to known formats;
based on the comparison, assign the respective type to the binary information.

23. The method of claim 21, wherein the converting includes:
normalizing semantics of names in the relevant binary information items into names of normalized binary specification components.

24. The method of claim 21, wherein the converting includes:
deconstructing binary types of existing elementary binary components into lists of elementary type traits.

25. The method of claim 21, wherein the converting includes:
deconstructing binary rules of existing elementary binary components into lists of ordered extensible parameters.

26. The method of claim 21, wherein the normalized binary specification components include:
(f) details including organization, version, date, and active/inactive status.

27. The method of claim 21, wherein the generating identifiers includes:

obtaining information from the normalized binary specification components; and generating the identifiers from the obtained information.

28. The method of claim 21, wherein the generating identifiers includes:

obtaining information from the normalized binary specification components; generating a first iteration of identifiers from the obtained information;

checking whether each of the identifiers in the first iteration is unique and, if not, generating a second iteration of identifiers in which the non-unique identifiers from the first iteration are made more complex.

29. The method of claim 21, comprising:

providing a domain specific normalized binary specification editing language for a user to edit content of the identified normalized binary specification components, wherein the domain specific normalized binary specification editing language searches for the identifiers and changes component information.

* * * * *